Nov. 26, 1968    M. A. NOTH    3,413,428
PRESSURE SWITCH WITH TIME DELAY
Filed Oct. 17, 1966    3 Sheets-Sheet 1
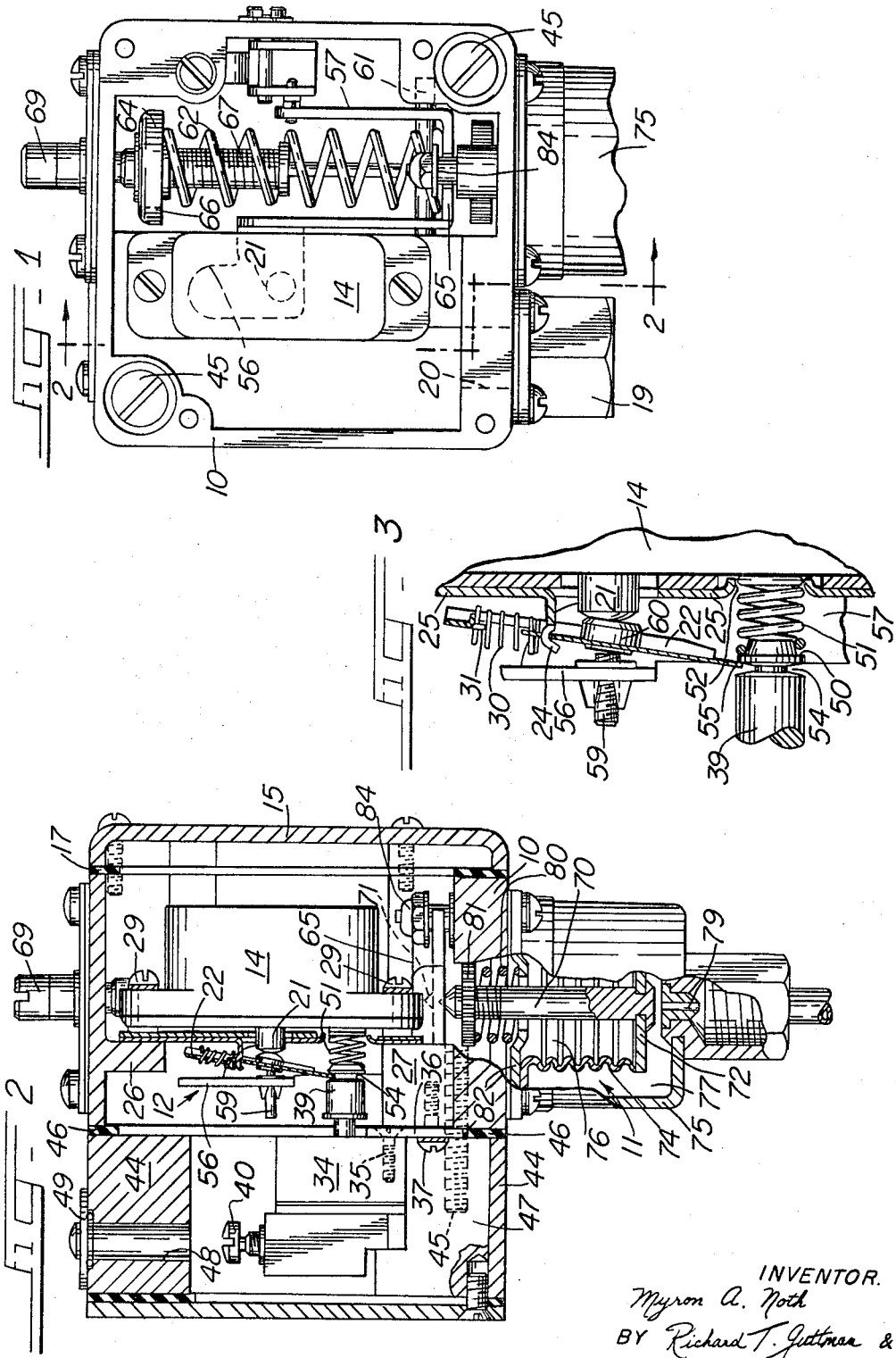
INVENTOR.
Myron A. Noth
BY Richard T. Guttman &
Daniel J. Rathbun
ATT'YS.

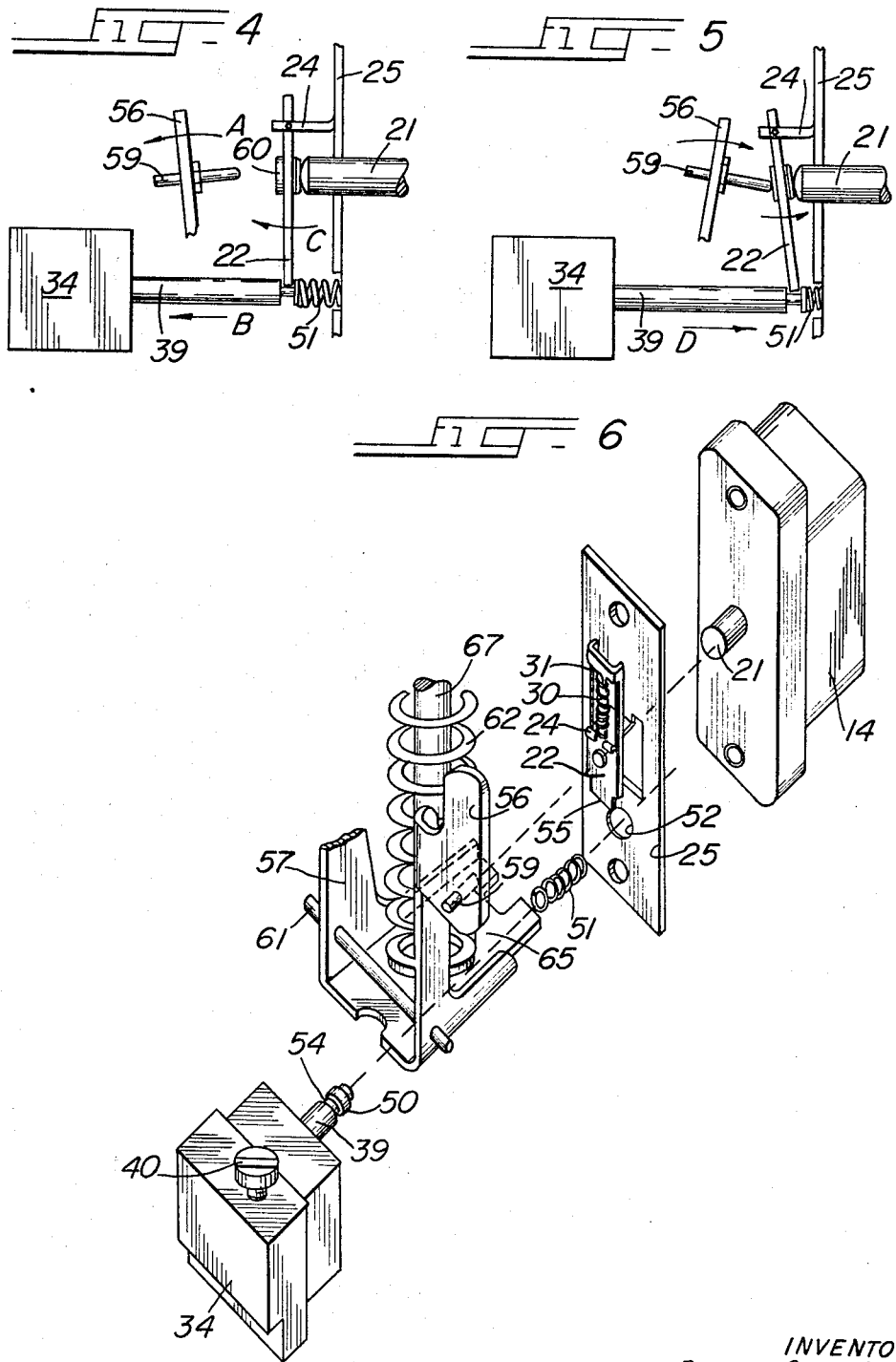

Nov. 26, 1968  M. A. NOTH  3,413,428
PRESSURE SWITCH WITH TIME DELAY
Filed Oct. 17, 1966  3 Sheets-Sheet 3
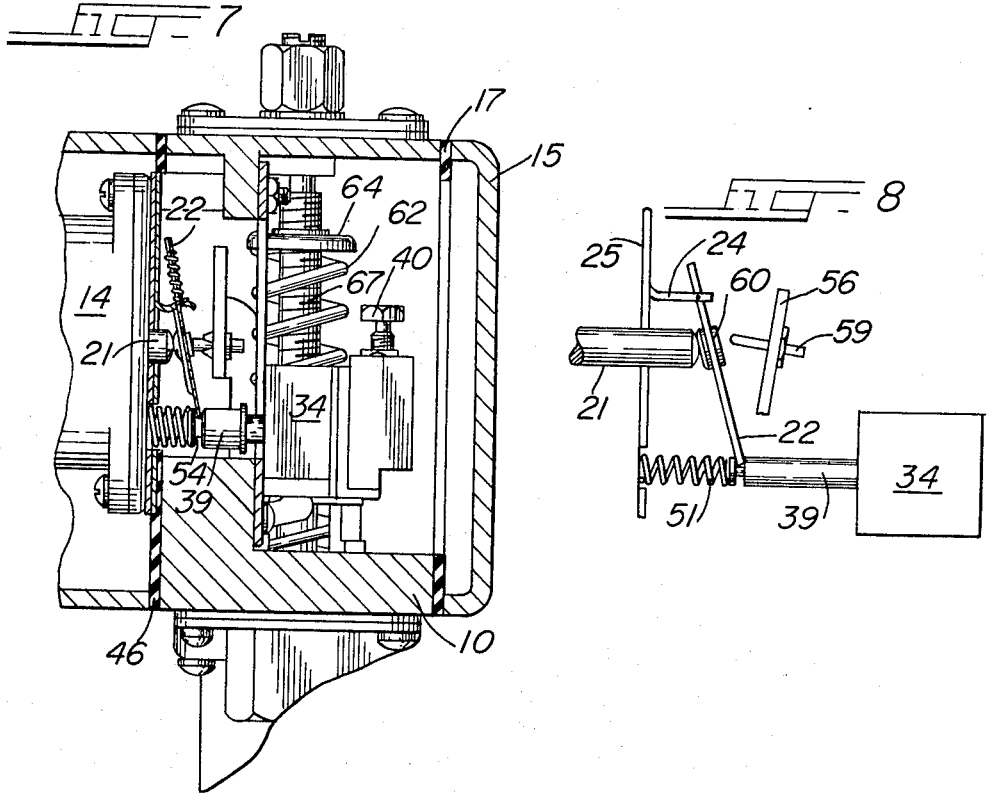
INVENTOR.
Myron A. Noth
BY Richard T. Guttman &

United States Patent Office 3,413,428
Patented Nov. 26, 1968

1

3,413,428
PRESSURE SWITCH WITH TIME DELAY
Myron A. Noth, Asheville, N.C., assignor to Square D Company, Park Ridge, Ill., a corporation of Michigan
Filed Oct. 17, 1966, Ser. No. 587,065
9 Claims. (Cl. 200—83)

This invention relates to pressure responsive electrical switches, and more particularly to a combined pressure responsive and time delay switch which opens and closes its contacts in response to pressure changes and which is insensitive to spurious momentary surges or pulses of pressure.

Pressure responsive electrical switches have long been used in the control circuits of pneumatic or hydraulically operated machines. Such switches are commonly employed in connection with welding equipment, machine tools and lubricating systems, and also in the automatic control of electrically driven pumping equipment used in domestic water systems. Ordinarily, such switches are provided with a calibrated adjustment means for selectively adjusting the range of pressures to which the switch is responsive and for selecting the precise values of pressure at which the switch operates.

In many pneumatic or hydraulic systems spurious pulsations or surges of short duration occur. For example, in a water system, momentary surges or pulsations occur when valves in the system are opened or closed, or when utilization devices are connected into and out of the system. Often the surge or pulse is of sufficient pressure to cause momentary operation of the switch contacts and consequent operation of the device controlled by the pressure switch. Thus, unless means are provided to render the pressure switch unresponsive to such spurious pulses, the device controlled by the switch is needlessly cycled between operative and inoperative conditions. If, for example, the controlled device is a motor driven pump, such rapid and unnecessary cycling results in needlessly increased wear on the pump and motor mechanism.

An object of this invention is to provide a pressure responsive electrical switch which is unresponsive to momentary increases of pressure but which responds accurately to other changes in pressure.

Another object is to provide a pressure switch in which operation of the contacts thereof is delayed upon a sudden increase in pressure, thereby to eliminate false operation of the contacts which would otherwise be caused by sudden momentary surges or pulsations of increasing pressure.

A further object is to provide a pressure switch which is insensitive to abnormal momentary increases of pressure, but which operates, under normal conditions, to open and close its contacts at preselected values of pressure without any reduction in sensitivity.

Still another object is to provide, in an alternative embodiment of this invention, a pressure responsive electrical switch which is unresponsive to momentary decreases of pressure but which responds accurately to other changes in pressure.

The foregoing objects are accomplished by the provision, in a pressure switch, of a time delay means which, in cooperation with an auxiliary lever means, delays

2 operation of the switch contacts for a time dependent upon the rate of change in the pressure to which the switch is subjected. In each embodiment, a pneumatic timer is arranged to limit the rate of movement of a reciprocable contact operator to a preselected rate even though the rate of change of pressure to which the switch is subjected is greater than that which would otherwise cause movement of the contact operator at said preselected rate. Thus, upon the occurrence of a sudden surge in pressure, operation of the switch contacts is delayed for a time; and, if the pressure surge is only of momentary duration, the switch contacts are prevented from operating and the pressure responsive mechanism is reset upon the cessation of the surge.

Other objects and advantages of this invention will become apparent from the following description wherein reference is made to the drawings, in which:

FIG. 1 is a front plan view of a pressure switch in accordance with this invention which is unresponsive to momentary increases of pressure, the cover of the switch being removed;

FIG. 2 is a sectional view of the pressure switch taken generally along the line 2—2 of FIG. 1 with additional portions of the structure broken away to facilitate explanation of the mechanism;

FIG. 3 is an enlarged view of a portion of the structure shown in FIG. 2;

FIG. 4 is a simplified diagrammatical sketch illustrating the operation of the pressure switch of FIGS. 1–3 upon the occurrence of a sudden rise in pressure;

FIG. 5 is a diagrammatic sketch illustrating the operation of the pressure switch of FIGS. 1–3 upon the occurrence of a decrease in pressure;

FIG. 6 is an exploded perspective view of part of the pressure switch of FIGS. 1–3;

FIG. 7 is a sectional view, taken similarly to the sectional view of FIG. 2, of an alternative embodiment, in accordance with this invention, of a pressure switch which is unresponsive to momentary decreases of pressure; and FIG. 8 is a diagrammatic sketch illustrating the operation of the pressure switch of FIG. 7.

Referring to FIGS. 1–6 of the drawings, a pressure switch in accordance with this invention comprises a casing 10, a fluid pressure responsive assembly such as the bellows assembly 11, an operating mechanism 12, and a snap switch 14. The operating mechanism 12 and the snap switch 14 are disposed within the casing 10. An open side of the casing 10 is closed by a cover plate 15 (FIG. 2), a gasket 17 being interposed between the casing 10 and the plate 15.

Electrical connections (not shown) to the snap switch 14 are conveniently made through a bushing 19 (FIG. 1) aligned with an opening 20 in the casing 10. The snap switch 14 may be either single or double pole and is operated by depression and by release of a self-restoring reciprocable contact operator such as a push button 21 which is responsive to the movement of an auxiliary lever means or actuating lever 22 forming part of the operating mechanism 12.

As best illustrated in FIGS. 3 and 6, the actuating lever 22 is supported for pivotal movement by a mounting tongue 24 which projects generally perpendicularly from a supporting bracket 25. The bracket 25 is secured between the switch 14 and upper and lower bosses 26 and 27 (FIG. 2) of the case 10 by screw fasteners 29 which also retain the switch 14 in the case 10. A compression spring 30 supported at one end by a tang 31 of the lever 22 has its other end disposed against the upper surface of the tongue 24 thereby to urge a pair of shouldered pivotal surfaces of the lever 22 into engagement with V-shaped underside portions of the tongue 24. In this manner, the lever 22 is secured for pivotal movement about the tongue 24, it being understood, however, that other methods of securing the lever 22 with respect to the casing 10 for pivotal movement in directions toward and away from the push button 21 might be used.

A damping means or timer 34, which may be similar to the pneumatic dashpot timer disclosed in U.S. Patent No. 3,254,177, issued May 31, 1966 and assigned to the same assignee as this application, is secured by a pair of screws 35, only one of which is shown, to a mounting plate 36 (FIG. 2). The plate 36 is, in turn, secured to the lower boss 27 by a pair of screws 37, only one of which is shown. The timer 34 is provided with an operating stem 39 mounted for endwise movement in a bore of the body of the timer. The constructional details of the timer 34 are not important for the purposes of this disclosure; it is required only that the timer be operable to retard the inward movement (to the left in FIG. 2) of the stem 39 to a timed rate, and that essentially free and unretarded movement of the stem 39 outwardly of the timer body (to the right in FIG. 2) be permitted.

The timer 34 has the foregoing capabilities and is provided with an adjusting screw 40 for selectively adjusting the maximum rate at which inward movement of the stem 39 is permitted by the timer. A protective housing 44 is secured to the casing 10 by a pair of screw bolts 45, a gasket 46 being interposed between the casing 10 and the housing 44. The bolts 45 are accessible from the front of the casing 10 when the cover 15 is removed (as shown in FIG. 1) and are threadedly received in thickened portions 47 of the housing 44, only one of the portions 47 being visible in FIG. 2. The housing 44 is provided with an access opening 48 which is normally closed by a screw fastened plate 49, the plate 49 being removable to permit convenient access to the adjusting screw 40 when it is desired to change or adjust the timing rate of the timer 34.

As best illustrated in FIG. 3, the distal end of the operating stem 39 is of narrowed diameter with respect to the shank portion thereof so as to define a circumferential shoulder 50 which supports one end of a compression spring 51, the other end of which extends through an opening 52 in the bracket 25 and is seated against the case of the switch 14. The purpose of the spring 51, as will be hereinafter more fully explained, is to assist in urging the operating stem 39 in the direction in which its movement is retarded by the timing operation of the timer 34.

The stem 39 has, in addition, a circumferential groove 54 near its distal end inwardly of the shoulder 50. This groove 54 receives an essentially flat lower end portion 55 of the actuating lever 22. In this manner, the movements of the lever 22 are related to corresponding movements of the stem 39 of the timer.

Movement of the lever 22 and the stem 39 is controlled by an arm 56 of an operating lever 57. The arm 56 carries an adjustable set screw 59 positioned to engage the outer face of a button 60 on the actuating lever 22. The operating lever 57 is pivoted on a shaft 61 supported in the case 10 and is biased by a range spring 62 disposed between an adjustable stop 64 and a base portion 65 of the lever 57. The bias of the range spring 62 is such that the set screw 59 on the arm 56 normally urges the button 60 and the lever 22 in a counterclockwise direction about its pivot point thereby to maintain the push button 21 depressed against its self-restoring bias. The adjustable stop 64 comprises a spring seat 66 carried by a threaded shaft 67 which is journaled in the upper wall of the casing 10 and terminates outside the casing 10 in a knurled head 69.

Referring now to FIGS. 1 and 2, movement of the lever 57 about the pivot shaft 61 with and against the bias of the range spring 62 is caused by reciprocal movement of a pin 70 having a conical end portion received in a complementary conical recess 71 in a bottom face of the base portion 65 of the lever 57. The pin 70 is secured at its opposite end to the center of a circular plate 72 which, in turn, is sealingly attached to the outer facing end or bottom of a flexible bellows 74 forming part of the bellows assembly 11. The other end of the bellows 74 is sealingly fastened throughout its periphery to an outer enclosure 75 which is itself mounted to the casing 10. The bellows 74 thereby serves to define inner and outer chambers 76 and 77, the outer chamber 77 having a central orifice 79 constituting an inlet orifice for the pressure switch and permitting operating fluid to enter the outer chamber 77 and impinge upon the bellows 74. Changes in the pressure of the operating fluid cause the bellows 74 to expand and contract, thereby to effect reciprocal movement of the pin 70 and pivotal movement of the operating lever 57 with and against the bias of the range spring 62.

An adjustment or calibration spring 80 surrounding the pin 70 is seated at one end against an adjustment nut 81 threaded on the pin 70 and at its other end in a recess in the face of a plate member 82 which overlies the bellows 74. The spring 80 urges the pin 70 and, hence, the circular plate 72, upwardly. The length of the spring 80, as selected by adjustment of the nut 81, determines the minimum pressure in the chamber 77 that will cause movement of the lever 57 against the bias of the range spring 62.

An increase of pressure in the chamber 77 causes upward movement of the pin 70 and, consequently, causes the lever 57 to pivot in a counterclockwise direction, as viewed from the lower right in FIG. 6, about its pivot shaft 61. A suitable stop 84 (FIGS. 1 and 2) may be provided to limit movement of the lever 57 in the counterclockwise direction. Upon a diminution of the pressure in the outer chamber 77, the range spring 62 causes the lever 57 to pivot about the pivot shaft 61 in the opposite direction, or clockwise as viewed in FIG. 6.

As is now evident, as the pressure of the fluid to which the switch is subjected increases, the arm 56 and its set screw 59 move to the left as seen in FIGS. 2 and 3, in a direction away from the button 60. Conversely, as the pressure decreases, the arm 56 moves to the right in a direction toward the button 60.

The function of the timer 34, the actuating lever 22, and the snap switch 14 in cooperation with the arm 56 will now be explained with reference to the diagrammatic representation of FIGS. 4 and 5 of the drawings.

Upon an increase in pressure, the arm 56 moves in a direction indicated by the arrow A. As the set screw 59 moves in a direction away from the button 60 on the lever 22, the force of the spring 51 causes the operating stem 39 of the timer 34 to move in a direction indicated by the arrow B. At the same time, because the end of the lever 22 away from its pivot point is received in a groove in the stem 39, the lever 22, aided by the force of the self-restoring push button 21, pivots clockwise in a direction indicated by the arrow C. Thus, as the arm 56 moves in the direction A, the button 60 moves to the left permitting the switch push button 21 to also move to the left under the force of its self-restoring bias.

As previously explained, the rate of movement of the stem 39 in the direction B, and thus the rate of movement to the left in FIG. 4 of the button 60, is governed by the timer 34. Accordingly, it is evident that, in the case of a gradual rise in the pressure to which the pressure switch is subjected, the button 60 and the push button 21 follow the gradual movement of the arm 56 so long as the rate of movement of the arm 56 does not exceed the maximum rate of movement of the stem 39 and lever 22 permitted by the timer 34. Thus, the pressure switch responds to gradual increases in pressure without any significant loss in sensitivity.

However, upon the occurrence of a sudden sharp rise in pressure, the arm 56 moves in the direction A at a rate faster than that permitted of the button 60 by the timer 34. Thereupon, the arm 56 and its set screw 59 fall away from the button 60 and the lever 22, the movement of the lever 22, the button 60 and the switch push button 21 being, as explained, at a rate governed by the timer 34. If the rise in pressure is only of momentary duration, the arm 59 returns to its previous steady-state position before the button 60 and the push button 21 have moved a distance sufficient to cause operation of the contacts of the switch 14. In this manner, the lever 22 and timer 34 render the pressure switch insensitive to spurious momentary increases in the pressure to which the switch is subjected.

On the other hand, if the suddenly increased pressure is maintained, the timer 34 will time out after a time, whereupon the lever 22, the button 60, and the switch pushbutton 21 will have moved to a position causing operation of the contacts of the switch 14.

The operating mechanism responds immediately to decreases in pressure regardless of the position of the lever 22 and the stem 39. This is because the timer 34 offers substantially no resistance to movement of its stem 39 in a resetting direction outwardly of the timer case (indicated by the direction of the arrow D in FIG. 5). Accordingly, no accumulating effect results from a succession of pressure pulses inasmuch as the timer 34 and the lever 22 are fully reset, as indicated in FIG. 5, each time the pressure drops to its steady-state value.

As is evident from the drawings, the basic pressure switch in which the time delay apparatus is provided may be of the well-known conventional type, it being necessary to add only the timer 34, the supporting bracket 25, the lever 22, and the spring 51 to the basic switch to provide the desired time delay operating feature. The basic pressure switch may be of any suitable type but, to permit precise operation, should be capable of rapid recycling. Further, to provide for flexibility in its application, it should be adjustable both as to the minimum pressure which will effect operation as well as to the range of pressure between ON and OFF switching. The pressure switch herein shown and described has all of the foregoing capabilities.

In certain instances it is desirable to provide a pressure switch in which a timer operates to provide a time delay upon a decrease in the pressure to which the switch is subjected. The principles of operation of such a pressure switch are similar to those of the previously described switch wherein the time delay occurs upon an increase in pressure. A time delay upon decreasing pressure may be provided for the basic pressure switch mechanism simply by interchanging the positions of the snap switch 14 and the pneumatic timer 34 relative to the operating arm 56 of the pressure switch from their respective positions shown in FIGS. 1 through 6. Thus, as shown in FIG. 7 and in the diagrammatic sketch of FIG. 8, upon a decrease in pressure, the arm 56 (which responds to pressure changes in exactly the same manner as in the embodiment of FIGS. 1–6) moves clockwise in a direction away from the button 60 and the lever 22. As in the case of the hereinbefore described operation, the rate of movement of the arm 22, the operating stem 39 and, consequently, that of the push button 21 of the snap switch 14 is governed by the timer 34. Thus, in a manner of operation similar to that previously described for the embodiment of FIGS. 1–6, the pressure switch of FIGS. 7 and 8 is rendered insensitive to momentary sharp decreases in the pressure of the fluid to which the switch is subjected. Upon an increase in pressure, the push button 21, the lever 22, and the stem 39 respond immediately, the timer 34 offering substantially no resistance to movement of the mechanism in the resetting direction (to the left in FIGS. 7 and 8).

I claim:

1. A pressure switch comprising means responsive to a change of fluid pressure to provide displacement of an operating means between a first and a second position at a rate directly related to the rate of the change in pressure, an actuating means movable between a first and a second position and effective in said first position to produce one controlling effect and in a second position to produce another controlling effect, resilient means urging said actuating means from said first position toward said second position and normally, regardless of the position of said operating means, into engagement with said operating means, spring means tending to maintain said operating means in its first position, and damping means connected to said actuating means to limit the speed of movement of said actuating means toward its second position when movement thereof is permitted by displacement of said operating means from one of its positions to its other position, whereby when said change of pressure exceeds a predetermined rate, movement of said actuating means occurs more slowly than said operating means to delay said controlling effect.

2. A pressure switch in accordance with claim 1 wherein movement of said actuating means toward its second position is permitted by displacement of said operating means from its first position toward its second position.

3. A pressure switch in accordance with claim 1 wherein movement of said actuating means toward its second position is permitted by displacement of said operating means from its second position toward its first position.

4. The pressure switch of claim 1 wherein said damping means is a dashpot timer having a body and having an operating stem mounted for endwise movement inwardly and outwardly of the body, said stem being connected to said actuating means for said endwise movement upon movement of said actuating means between said first and second positions thereof, the rate of movement of said stem in one direction being limited to less than the rate of displacement of the operating means under a pressure change in excess of said predetermined rate, the movement of said stem in the other direction being substantially unrestrained.

5. The pressure switch of claim 4 wherein said actuating means comprises an actuating lever having a connecting portion at its free end, said connecting portion being received in a circumferential groove in the operating stem of said timer thereby to effect the connection between said actuating means and said damping means.

6. The pressure switch of claim 1 wherein said controlling effects are provided by a snap action electrical switch having electrical contacts movable between first and second circuit controlling positions by said actuating means.

7. The pressure switch of claim 6 wherein said switch includes a self-restoring push button engageable by said actuating means for operating said contacts.

8. A pressure switch according to claim 7 and including a casing for said pressure switch, and wherein said actuating means comprises an actuating lever pivotally supported on said casing with said push button of said switch in continually abutting relationship with said lever.

9. A pressure switch comprising a casing, a fluid pressure responsive assembly attached to the casing and having pressure responsive means movable in response to changes in fluid pressure at a rate directly related to the rate of the change in pressure, an operating lever pivotally supported on said casing and movable by said pressure responsive means between a first position corresponding to a relatively low pressure and a second position corresponding to a relatively high pressure, an actuating lever pivotally supported on said casing for movement between a first and a second position, a snap action electrical switch disposed within said casing and having electrical contacts movable between first and second circuit controlling positions and a self-restoring reciprocable push button for moving said contacts between said positions, said push button being disposed in continually abutting relationship with said actuating lever so as to be reciprocated by movement of said actuating lever between its first and second positions, resilient means urging said actuating lever from its first position toward its second position and normally, regardless of the position of said operating lever, into engagement with said operating lever, spring means tending to maintain said operating lever in its first position, and a dashpot timer supported on said casing and having an operating stem mounted for endwise movement, the rate of movement of said stem in one direction being limited to a rate less than the maximum rate of movement of the operating lever, said actuating lever having a portion at its free end connected with said operating stem to limit the speed of movement of said actuating lever toward its second position when movement thereof is permitted by displacement of said operating lever from one of its positions to its other position, whereby when said change of pressure exceeds a predetermined rate, movement of said actuating lever occurs more slowly than said operating lever to delay the movement of said contacts between their first and second circuit controlling positions.

References Cited
UNITED STATES PATENTS

| | | | |
|---|---|---|---|
| 2,137,550 | 11/1938 | Tayor | 200—83.9 |
| 2,188,438 | 1/1940 | Judson et al. | 200—83.9 X |
| 2,189,653 | 2/1940 | Luthe | 200—83.9 |
| 2,620,413 | 12/1952 | Johnson | 200—83.9 |
| 3,069,514 | 12/1962 | Frick | 200—166 X |
| 3,187,121 | 1/1965 | Mingrone | 200—83.9 X |
| 3,254,177 | 5/1966 | Gottsacker et al. | 335—60 |

ROBERT K. SCHAEFER, *Primary Examiner.*

H. BURKS. *Assistant Examiner.*